(12) United States Patent
Min et al.

(10) Patent No.: US 12,024,577 B2
(45) Date of Patent: Jul. 2, 2024

(54) PREPARATION METHOD OF SUPER ABSORBENT POLYMER

(71) Applicant: LG CHEM, LTD., Seoul (KR)

(72) Inventors: Yoon Jae Min, Daejeon (KR); Gicheul Kim, Daejeon (KR); Young Cheol Jung, Daejeon (KR); Wonchan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 114 days.

(21) Appl. No.: 17/612,429

(22) PCT Filed: Jan. 20, 2021

(86) PCT No.: PCT/KR2021/095026
§ 371 (c)(1),
(2) Date: Nov. 18, 2021

(87) PCT Pub. No.: WO2021/150095
PCT Pub. Date: Jul. 29, 2021

(65) Prior Publication Data
US 2022/0242990 A1    Aug. 4, 2022

(30) Foreign Application Priority Data

Jan. 20, 2020  (KR) .................... 10-2020-0007114
Jan. 19, 2021  (KR) .................... 10-2021-0007622

(51) Int. Cl.
C08K 5/11         (2006.01)
C08F 290/06       (2006.01)

(52) U.S. Cl.
CPC ............ *C08F 290/062* (2013.01); *C08K 5/11* (2013.01)

(58) Field of Classification Search
CPC .... C08F 290/062; C08K 5/11; C08J 2333/02; C08J 3/075; C08J 3/12; C08J 3/24;
(Continued)

(56) References Cited

U.S. PATENT DOCUMENTS 6,291,636 B1      9/2001 Miyake et al.
2002/0193516 A1  12/2002 Bucevschi et al.
(Continued)

FOREIGN PATENT DOCUMENTS

CN     105814088 A    7/2016
CN     106661235 A    5/2017
(Continued)

OTHER PUBLICATIONS

International Search Report [ISR-1] (with partial translation) and Written Opinion issued in corresponding International Patent Application No. PCT/KR2021/095026, dated Apr. 28, 2021.
(Continued)

*Primary Examiner* — Robert S Jones, Jr.
*Assistant Examiner* — Jiangtian Xu
(74) *Attorney, Agent, or Firm* — Morgan, Lewis & Bockius LLP

(57) ABSTRACT

The present disclosure relates to a preparation method of a super absorbent polymer. More specifically, it relates to a preparation method of a super absorbent polymer capable of significantly reducing the amount of fine powder generated during the process by mixing a hydrogel polymer with an additive having a specific structure, pulverizing it, and then drying it with a paddle-type dryer.

19 Claims, 3 Drawing Sheets

(58) Field of Classification Search
CPC . C08J 3/245; B29B 7/002; B29B 9/12; B29B 9/16
See application file for complete search history.

(56) References Cited

U.S. PATENT DOCUMENTS

| | | |
|---|---|---|
| 2010/0130950 A1 | 5/2010 | Harren et al. |
| 2012/0035294 A1 | 2/2012 | Kim et al. |
| 2012/0289607 A1 | 11/2012 | Xiong et al. |
| 2013/0026412 A1 | 1/2013 | Machida et al. |
| 2013/0098809 A1 | 4/2013 | Stueven et al. |
| 2016/0311985 A1 | 10/2016 | Jung et al. |
| 2017/0158827 A1 | 6/2017 | Thompson et al. |
| 2017/0233534 A1 | 8/2017 | Kim et al. |
| 2018/0037686 A1 | 2/2018 | Lee et al. |
| 2018/0185292 A1 | 7/2018 | Rahmouni et al. |
| 2018/0298132 A1 | 10/2018 | Yorino et al. |
| 2019/0194367 A1 | 6/2019 | Lee et al. |
| 2019/0329219 A1 | 10/2019 | Watabe et al. |
| 2019/0329220 A1* | 10/2019 | Watabe .............. F26B 17/00 |
| 2019/0338082 A1* | 11/2019 | Iwamura ............ A61L 15/22 |
| 2020/0155458 A1* | 5/2020 | Wagner-Hattler ... A61K 9/2009 |
| 2020/0207929 A1 | 7/2020 | Nam et al. |
| 2021/0147637 A1 | 5/2021 | Matsumoto et al. |
| 2022/0212166 A1 | 7/2022 | Kim et al. |

FOREIGN PATENT DOCUMENTS

| | | |
|---|---|---|
| CN | 107922630 A | 4/2018 |
| EP | 0948997 A2 | 10/1999 |
| EP | 3248991 A1 | 11/2017 |
| GB | 2312213 A | 10/1997 |
| JP | 2009-173920 A | 8/2009 |
| JP | 2011-252088 A | 12/2011 |
| JP | 2017-502108 A | 1/2017 |
| JP | 2018-203997 A | 12/2018 |
| JP | 2022-533035 A | 7/2022 |
| KR | 10-2010-0019416 A | 2/2010 |
| KR | 10-2011-0006771 A | 1/2011 |
| KR | 10-2015-0067729 A | 6/2015 |
| KR | 10-2016-0112220 A | 9/2016 |
| KR | 10-2017-0041709 A | 4/2017 |
| KR | 10-2018-0112110 A | 10/2018 |
| KR | 10-2019-0012811 A | 2/2019 |
| KR | 10-2019-0035314 A | 4/2019 |
| KR | 10-2019-0064978 A | 6/2019 |
| KR | 10-2019-0077359 A | 7/2019 |
| KR | 10-2019-0077541 A | 7/2019 |
| WO | 97/38740 A1 | 10/1997 |
| WO | 2009/076764 A1 | 6/2009 |
| WO | 2011/038374 A2 | 3/2011 |
| WO | 2016/148397 A1 | 9/2016 |
| WO | 2016/204302 A1 | 12/2016 |
| WO | 2018/092863 A1 | 5/2018 |
| WO | 2018/092864 A1 | 5/2018 |
| WO | 2019/221236 A1 | 11/2019 |

OTHER PUBLICATIONS

Search Report [ISR-2] issued in corresponding International Patent Application No. PCT/KR2020/018644, dated Apr. 13, 2021 (partial translation).

Schwalm, "UV Coatings Basics, Recent Developments and New Applications," Elsevier Science, 2007, p. 115.

Odian, "Principles of Polymerization," 2nd Edition, 1981, Wiley, p. 203.

Extended European Search Report dated May 27, 2022 issued in corresponding European Patent Application No. 20902298.7.

* cited by examiner

[FIG. 1]
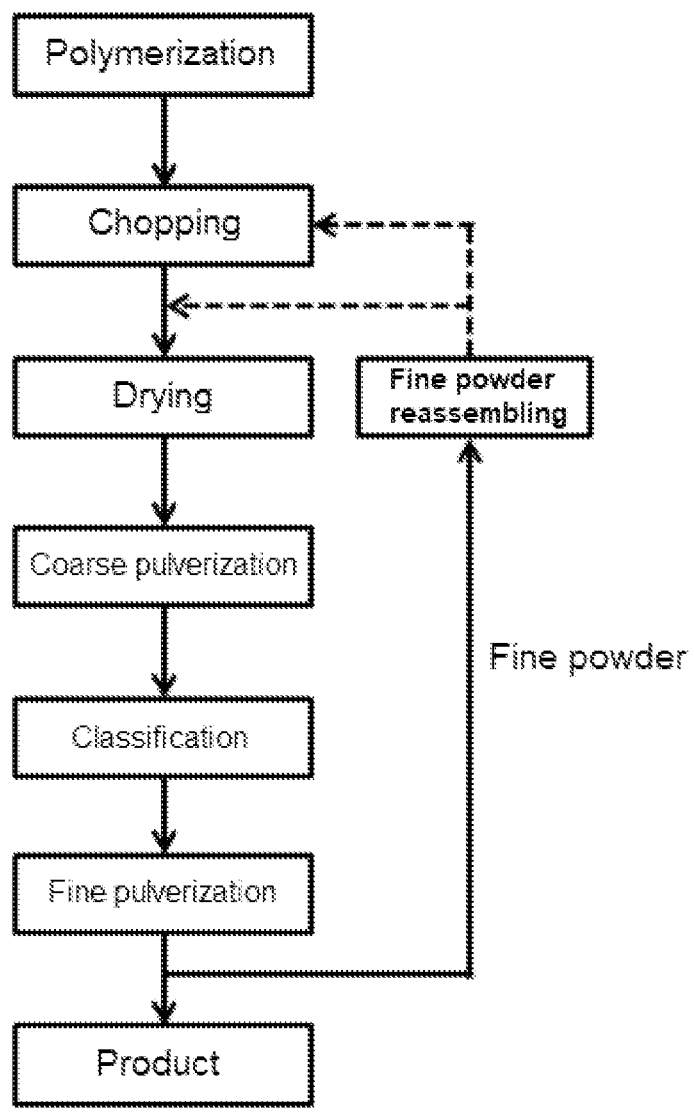

[FIG. 2]
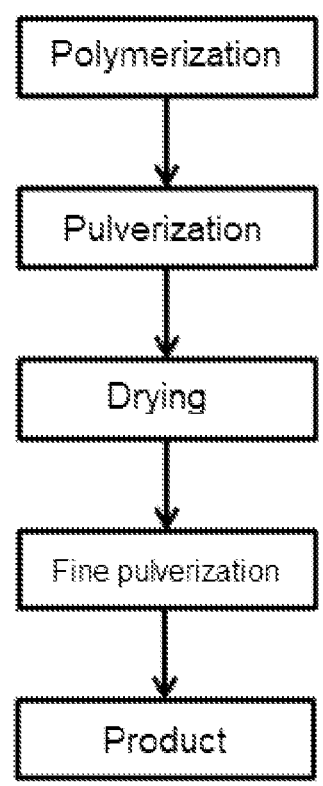

【FIG. 3】
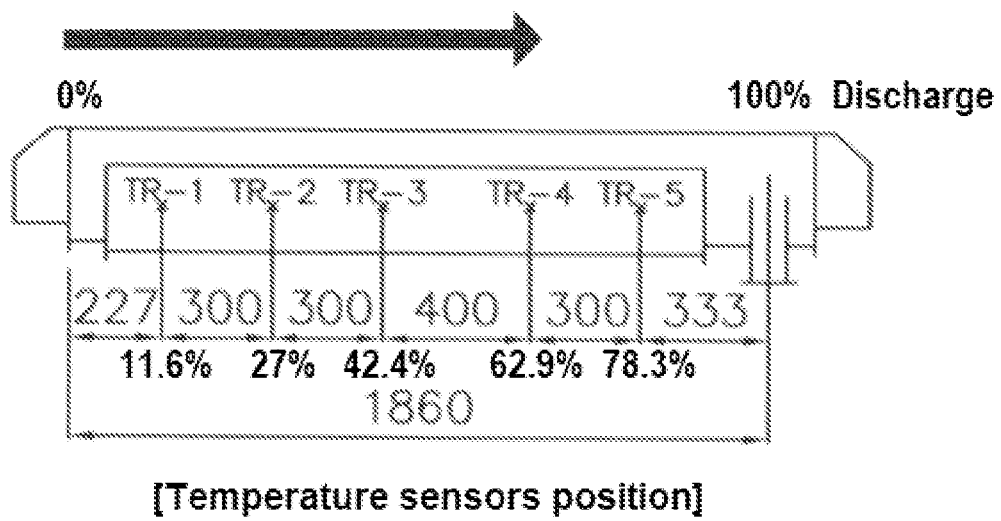
[Temperature sensors position]
【FIG. 4】
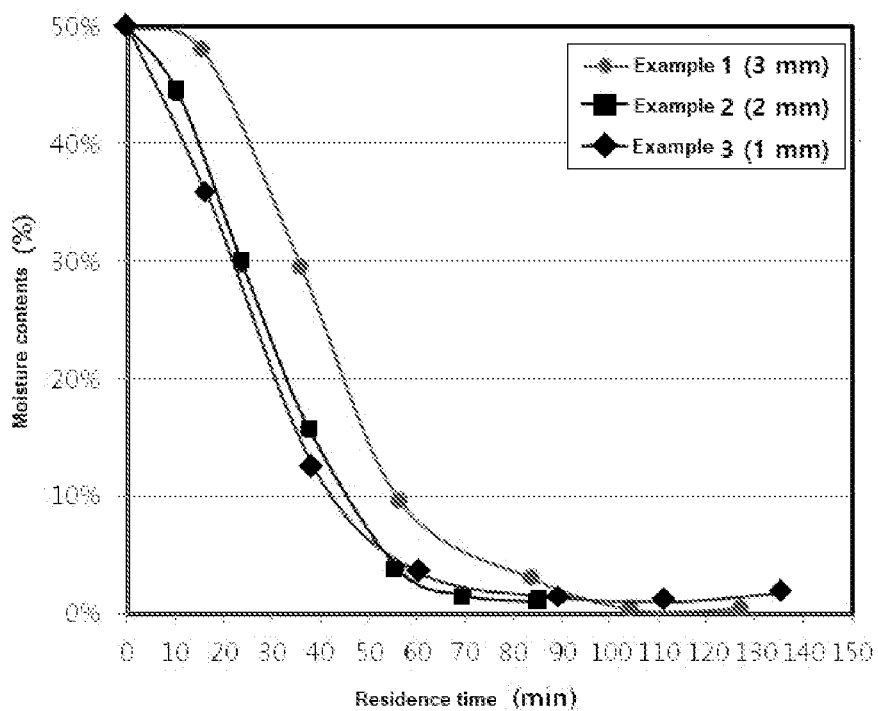

PREPARATION METHOD OF SUPER ABSORBENT POLYMER

CROSS-REFERENCE TO RELATED APPLICATION(S)

This application claims the benefit of Korean Patent Applications No. 10-2020-0007114 filed on Jan. 20, 2020 and No. 10-2021-0007622 filed on Jan. 19, 2021 with the Korean Intellectual Property Office, the disclosures of which are incorporated herein by reference in their entirety.

TECHNICAL FIELD

The present disclosure relates to a preparation method of a super absorbent polymer. More specifically, it relates to a preparation method of a super absorbent polymer in which the amount of fine powder generated is significantly reduced.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to more efficiently absorb a large amount of liquid such as urine, it is necessary for the super absorbent polymer to basically exhibit high absorption performance as well as fast absorption rate.

Meanwhile, such a super absorbent polymer is generally prepared by the method including a step of polymerizing a monomer to prepare a hydrogel polymer containing a large amount of moisture, and a step of drying the hydrogel polymer, and then pulverizing the dried hydrogel polymer into polymer particles having a desired particle diameter. However, when the hydrogel polymer is dried and then pulverized as described above, a large amount of fine powder is generated, and thus there has been a problem of deteriorating physical properties of the finally produced super absorbent polymer.

In addition, in order to reuse such fine powder, it is common to use a fine powder reassembly which is obtained by mixing the fine powder with water to agglomerate, followed by drying/pulverization/classification. However, due to the water used at this time, a problem such as an increase in energy consumption during the drying process and an increase in a load on the device may occur, and thus productivity in the preparation of the super absorbent polymer may decrease.

Accordingly, there is a continuous demand for the development of a technology capable of manufacturing a super absorbent polymer without generating fine powder, so as to fundamentally solve this problem.

DETAILED DESCRIPTION OF THE INVENTION

Technical Problem

Accordingly, the present disclosure relates to a preparation method of a super absorbent polymer capable of significantly reducing the amount of fine powder generated during the process by mixing a hydrogel polymer with an additive having a specific structure, pulverizing it, and drying it with a paddle-type dryer.

Technical Solution

In order to solve the above problems, there is provided a preparation method of a super absorbent polymer including 1) a step of forming a hydrogel polymer by cross-linking polymerization of a water-soluble ethylene-based unsaturated monomer having at least partially neutralized acidic groups in the presence of an internal cross-linking agent and a polymerization initiator (Step 1);

2) a step of mixing the hydrogel polymer with a carboxylic acid-based additive, followed by pulverization to prepare a pulverized product containing hydrous super absorbent polymer particles (Step 2);

3) a step of drying the pulverized product with a paddle-type dryer to prepare super absorbent polymer particles (Step 3); and 4) a step of fine-pulverizing particles having a particle diameter of more than 850 μm among the super absorbent polymer particles (Step 4), wherein the carboxylic acid-based additive is at least one selected from the group consisting of a carboxylic acid represented by the following Chemical Formula 1 and a salt thereof:

[Chemical Formula 1]

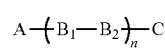

in Chemical Formula 1,
A is alkyl having 5 to 21 carbon atoms,
$B_1$ is —OCO—, —COO—, or —COOCH($R_1$)COO—,
$B_2$ is —$CH_2$—, —$CH_2CH_2$—, —CH($R_2$)—, —CH=CH—, or —C≡C—,
wherein, $R_1$ and $R_2$ are each independently alkyl having 1 to 4 carbon atoms,
n is an integer of 1 to 3, and
C is a carboxyl group.

Advantageous Effects

According to the preparation method of a super absorbent polymer of the present disclosure, hydrous super absorbent polymer particles can be prepared by pulverizing a hydrogel polymer in the presence of the carboxylic acid-based additive. Furthermore, even in the drying process using a paddle-type dryer, agglomeration between particles is suppressed to obtain a granulated dried product, so that the amount of dry pulverization after drying can be drastically reduced. Accordingly, it is possible to manufacture a super absorbent polymer in which the amount of fine powder is significantly reduced.

BRIEF DESCRIPTION OF THE DRAWINGS

FIG. 1 is a flow chart illustrating a conventional preparation method of a super absorbent polymer.

FIG. 2 is a flow chart illustrating a preparation method of a super absorbent polymer according to an embodiment.

FIG. 3 shows a position where temperature sensors are installed in the paddle dryer used in Examples 1 to 3.

FIG. 4 is a graph showing the moisture content with respect to residence time in a paddle dryer for each of pulverized products prepared in Step 2 of Examples 1 to 3.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the preparation method of a super absorbent polymer and the super absorbent polymer prepared therefrom will be described in more detail according to specific embodiments of the present invention.

The terminologies are used merely to refer to specific embodiments, and are not intended to restrict the present disclosure unless it is explicitly expressed. Singular expressions of the present disclosure may include plural expressions unless they are differently expressed contextually.

According to one embodiment of the present disclosure, there is provided a preparation method of a super absorbent polymer including 1) a step of forming a hydrogel polymer by cross-linking polymerization of a water-soluble ethylene-based unsaturated monomer having at least partially neutralized acidic groups in the presence of an internal cross-linking agent and a polymerization initiator (Step 1);

2) a step of mixing the hydrogel polymer with a carboxylic acid-based additive, followed by pulverization to prepare a pulverized product containing hydrous super absorbent polymer particles (Step 2);

3) a step of drying the pulverized product with a paddle-type dryer to prepare super absorbent polymer particles (Step 3); and 4) a step of fine-pulverizing particles having a particle diameter of more than 850 μm among the super absorbent polymer particles (Step 4), wherein the carboxylic acid-based additive is at least one selected from the group consisting of a carboxylic acid represented by the following Chemical Formula 1 and a salt thereof:

[Chemical Formula 1]

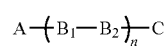

in Chemical Formula 1,

A is alkyl having 5 to 21 carbon atoms, $B_1$ is —OCO—, —COO—, or —COOCH($R_1$)COO—, $B_2$ is —$CH_2$—, —$CH_2CH_2$—, —CH($R_2$)—, —CH=CH—, or —C≡C—, wherein, $R_1$ and $R_2$ are each independently alkyl having 1 to 4 carbon atoms, n is an integer of 1 to 3, and C is a carboxyl group.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 30 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which a water-soluble ethylene-based unsaturated monomer having at least partially neutralized acidic groups is polymerized and cross-linked by an internal cross-linking agent.

In addition, the terminology "super absorbent polymer" is used to encompass all of a cross-linked polymer in which a water-soluble ethylene-based unsaturated monomer having at least partially neutralized acidic groups is polymerized or a base resin in the form of powder consisting of super absorbent polymer particles in which the cross-linked polymer is pulverized, and the cross-linked polymer or the base resin further processed, for example, drying, pulverization, classification, surface cross-linking, etc., to be in a state suitable for commercialization, depending on the context. Accordingly, the terminology "super absorbent polymer" may be interpreted as encompassing a composition including a super absorbent polymer, that is, a plurality of super absorbent polymer particles.

In addition, the terminology "normal super absorbent polymer particles" refers to particles having a particle diameter of 150 μm to 850 μm among super absorbent polymer particles.

In addition, the terminology "fine powder" refers to particles having a particle diameter of less than 150 μm among super absorbent polymer particles. The particle diameter of these polymer particles can be measured in accordance with EDANA WSP 220.3 by the European Disposables and Nonwovens Association (EDANA).

In addition, the terminology "chopping" refers to cutting the hydrogel polymer into small pieces to increase drying efficiency, and is used separately from pulverization to a normal particle size.

Super absorbent polymers are conventionally prepared by drying a hydrogel polymer and then pulverizing it to a desired particle size. At this time, in order to facilitate drying of the hydrogel polymer and increase an efficiency of the pulverization process, a process of chopping the hydrogel polymer is performed before the drying process. However, due to tackiness of the hydrogel polymer in this chopping process, the hydrogel polymer cannot be pulverized to micro-sized particles and becomes an agglomerated gel. When the agglomerated gel-shaped hydrogel polymer is dried in a fixed-bed type manner, a plate-shaped dried body is formed, and in order to pulverize it to the micro-sized particles, a multi-stage pulverization process is required. Therefore, there has been a problem that many fine powders are generated in this process.

Specifically, FIG. 1 shows a flow chart of a conventional preparation method of a super absorbent polymer. Referring to FIG. 1, in the related art, a super absorbent polymer has been prepared including the following steps.

(Polymerization) Cross-linking polymerization of a water-soluble ethylene-based unsaturated monomer having at least partially neutralized acidic groups in the presence of an internal cross-linking agent and a polymerization initiator to form a hydrogel polymer;

(Chopping) Chopping the hydrogel polymer;

(Drying) Drying the chopped hydrogel polymer; and (Coarse pulverization/classification/fine pulverization) Pulverizing the dried polymer, and then classifying the pulverized polymer into normal particles and fine powder;

As described above, the chopped hydrogel polymer has an agglomerated gel shape having a size of about 1 cm to 10 cm. This chopped hydrogel polymer is laminated on a belt with a perforated plate on the bottom, and dried in a fixed-bed type manner by hot air supplied from the bottom or the top. Since the polymer dried by the above drying method has a plate shape rather than a particle shape, the step of pulverization, followed by classification has been performed as a step of coarse pulverization, followed by classification and then fine pulverization, followed by classification again so that the produced particles become normal particles, that is, particles having a particle diameter of 150 μm to 850 μm. However, since coarse pulverization and fine pulverization after drying are performed in a dry manner, a large amount of fine powder is generated in the pulverizing process. Specifically, the amount of fine powder separated in the final classification step by this preparation method was as large as about 15 wt % to about 25 wt % based on the total weight of the finally prepared super absorbent polymer, so that the separated fine powder was mixed with an appropriate amount of water for reassembling, and added to the chopping step or before the drying step.

However, when re-injecting the fine powder reassembly mixed with water into the pulverization or drying process for the reuse of the fine powder, problems such as causing an increase in a load on the device and/or energy consumption have occurred. In addition, physical properties of the super absorbent polymer were deteriorated due to the fine powder that was not classified and remained.

Accordingly, the present inventors have recognized that the amount of fine powder generated in the conventional preparation method is largely influenced by the particle size introduced into the pulverization process, and determined that if the hydrogel polymer can be pulverized to a micro size without agglomeration between the hydrogel polymers in the chopping process, the amount of fine powder generated during the process can be reduced. Accordingly, as a result of experimenting with various types of additives that can lower tackiness of the hydrogel polymer in the chopping process, it was confirmed that when the hydrogel polymer is mixed with the carboxylic acid-based additive and then pulverized, the tackiness of the hydrogel polymer is lowered due to the carboxylic acid-based additive, and thus pulverization is possible into micro-level particles. And from this, the present invention was completed. This is because the carboxylic acid-based additive mixed with the hydrogel polymer is adsorbed on the surface of the hydrogel polymer, thereby preventing agglomeration of the pulverized hydrogel polymers. In addition, since the drying process is performed in the form of micro-sized particles, the drying may be effective.

Specifically, the carboxylic acid-based additive has a hydrophobic functional group and a hydrophilic functional group at the same time. Meanwhile, since the water-soluble ethylene-based unsaturated monomer contains an acidic group (—COOH) and/or a neutralized acidic group (—COO$^-$), a large amount of hydrophilic moiety is present on a surface of the hydrogel polymer prepared by polymerization due to the acidic group (—COOH) and/or the neutralized acidic group (—COO$^-$) remaining without participating in polymerization. Therefore, when the additive is mixed with the hydrogel polymer, a hydrophilic functional group of the additive is adsorbed to at least some part of the hydrophilic moiety present on the surface of the hydrogel polymer, and the surface of the polymer to which the additive is adsorbed becomes hydrophobic by a hydrophobic functional group located at the other end of the additive. Accordingly, agglomeration between polymer particles can be suppressed.

More specifically, in the carboxylic acid-based additive, the hydrophobic functional group is a alkyl having 5 to 21 carbon atoms group (part A), and the hydrophilic functional group is part C, specifically, a carboxyl group (COOH) or a carboxylate group (—COO$^-$) in the case of a salt. The hydrophobic functional group and the hydrophilic functional group are respectively located at both ends of the additive. In particular, the carboxylic acid-based additive further includes part ($B_1$-$B_2$) in addition to part A and part C at both ends, and the part ($B_1$-$B_2$) improves adsorption performance with respect to the polymer surface, which may be insufficient only with the part C. Accordingly, the additive having the structure of Chemical Formula 1 has excellent adsorption performance with respect to the polymer surface exhibiting hydrophilicity compared to the compound having an A-C structure without the part ($B_1$-$B_2$), and thus effectively inhibits agglomeration of the hydrous super absorbent polymer particles.

Further, it is preferable that the pulverized product containing the hydrous super absorbent polymer particles is dried in a moving type manner. Herein, the moving type drying is classified from a fixed-bed type drying according to whether or not materials flow during drying. More specifically, the moving type drying refers to a method of mechanically stirring a material to be dried or a method of drying while a particle layer is flowing by gas. On the other hand, the fixed-bed type drying refers to a method in which a material to be dried is fixed on a floor such as a porous iron plate through which air can pass, and hot air passes through the material from bottom to top to dry.

When the pulverized product containing hydrous super absorbent polymer particles is dried in a moving type manner, an agglomeration phenomenon between the hydrous super absorbent polymer particles is prevented, so that a granulated dried product can be obtained. Accordingly, there is an advantage that drying can be completed in a short time without requiring a process of coarsely pulverizing or pulverizing the agglomerated particles after drying.

As a device capable of drying by such a moving-type drying manner, a paddle-type dryer, a horizontal-type mixer, a rotary kiln, or a steam tube dryer can be used. Among them, it is preferable to dry the pulverized product using a paddle-type dryer in terms of installation cost, throughput per unit volume, and heat transfer efficiency. Specifically, the paddle-type dryer has advantages in that an area required for installation is small, installation is simple, and throughput per unit volume is high. However, in order to dry the pulverized product at high throughput per unit volume, agglomeration between hydrous super absorbent polymer particles should not occur during drying. The hydrous super absorbent polymer particles mixed with the above-described carboxylic acid-based additive have excellent effect of inhibiting agglomeration between particles, and thus can be dried using a paddle-type dryer having high throughput per unit volume.

On the other hand, since the chopped hydrogel polymer not mixed with the carboxylic acid-based additive agglomerates with each other during drying, drying using a paddle-type dryer is impossible. In addition, even when a conventionally known surfactant other than the carboxylic acid-based additive, for example, a betaine-based amphoteric surfactant, is polymerized with a hydrogel polymer and then pulverized, the effect of inhibiting agglomeration between particles is not good. Therefore, drying in a rotary heating device such as a steam tube dryer with low throughput per unit volume may be possible, but it is difficult to perform drying by a paddle-type dryer having high density between pulverized particles due to large throughput per unit volume.

Specifically, FIG. 2 shows a flow chart of a preparation method of a super absorbent polymer composition according to an embodiment. Referring to FIG. 2, a super absorbent polymer may be prepared by performing only the step of fine-pulverizing particles having a particle diameter of more than 850 μm among the super absorbent polymer particles after preparing a hydrogel polymer, followed by pulverization and drying, unlike the conventional preparation method of a super absorbent polymer. Accordingly, since the coarse pulverization process which is a dry pulverization process after drying can be omitted, the amount of fine powder generated during the process can be significantly reduced and manufacturing cost may be also reduced, considering that the coarse pulverization is a step in which the amount of fine powder is increased.

In addition, according to the preparation method of a super absorbent polymer, when the hydrogel is pulverized in a state in which the hydrogel polymer and the carboxylic acid-based additive are mixed, the adhesion between particles is weakened by hydrophobic functional groups of the carboxylic acid-based additive, and excessive agglomeration between granulated hydrogels is prevented, thereby increasing a specific surface area, and accordingly, a vortex time of the super absorbent polymer may be improved.

Meanwhile, extractable contents (E/C) that have participated in polymerization but have a short chain without being bound to main chain may exist in the super absorbent polymer. These extractable contents are not preferred because they can cause rewetting. Specifically, when chopping the hydrogel polymer in which the carboxylic acid-based additive is not mixed, the hydrogel polymer is granulated and agglomerated again due to tackiness. Accordingly, the hydrogel polymer is subjected to a mechanical shear in the chopper, which causes damage to the polymer chain, resulting in an increase in extractable contents. However, in the case of the preparation method of a super absorbent polymer, re-agglomeration of the granulated hydrogel formed is prevented by the hydrophobic functional groups of the carboxylic acid-based additive, and thus the granulated hydrogel can easily pass through the perforated plate of the chopper. Therefore, excessive mechanical shear can be prevented from acting on the hydrogel, so that extractable contents present in the super absorbent polymer can be reduced.

Hereinafter, the preparation method of a super absorbent polymer composition of one embodiment will be described in more detail for each component.

(Step 1)

The above step is to form a hydrogel polymer by cross-linking polymerization of a water-soluble ethylene-based unsaturated monomer having at least partially neutralized acidic groups in the presence of an internal cross-linking agent and a polymerization initiator, and may consist of a step of preparing a monomer composition by mixing a water-soluble unsaturated monomer, an internal cross-linking agent and a polymerization initiator, and a step of forming a hydrogel polymer by thermal polymerization or photopolymerization of the monomer composition.

The water-soluble ethylene-based unsaturated monomer may be any monomer commonly used in the preparation of a super absorbent polymer. As a non-limiting example, the water-soluble ethylene-based unsaturated monomer may be a compound represented by the following Chemical Formula 2:

$$R\text{—}COOM' \qquad \text{[Chemical Formula 2]}$$

in Chemical Formula 2,

R is a C2 to C5 alkyl group having an unsaturated bond, and

M' is a hydrogen atom, a monovalent or divalent metal, an ammonium group, or an organic amine salt.

Preferably, the monomer may be at least one selected from the group consisting of (meth)acrylic acid, and a monovalent (alkali)metal salt, a divalent metal salt, an ammonium salt and an organic amine salt of the acid.

When (meth)acrylic acid and/or a salt thereof is used as a water-soluble ethylene-based unsaturated monomer, it is advantageous to obtain a super absorbent polymer having improved absorption performance. In addition, maleic anhydride, fumaric acid, crotonic acid, itaconic acid, 2-acryloylethane sulfonic acid, 2-methacryloylethanesulfonic acid, 2-(meth)acryloylpropanesulfonic acid, 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth)acrylamide, or the like may be used as the monomer.

Herein, the water-soluble ethylene-based unsaturated monomer may have acidic groups, and at least some of the acidic groups may be neutralized by a neutralizing agent. Specifically, in the step of mixing the water-soluble ethylene-based unsaturated monomer having acidic groups, the internal cross-linking agent, the polymerization initiator and the neutralizing agent, at least some of the acidic groups of the water-soluble ethylene-based unsaturated monomer may be neutralized. In this case, a basic substance such as sodium hydroxide, potassium hydroxide, and ammonium hydroxide capable of neutralizing acidic groups may be used as the neutralizing agent.

In addition, a degree of neutralization of the water-soluble ethylene-based unsaturated monomer may be 50 to 90 mol %, 60 to 85 mol %, 65 to 85 mol %, or 65 to 75 mol %, wherein the degree of neutralization refers to the degree to which the acidic groups contained in the water-soluble ethylene-based unsaturated monomer are neutralized by the neutralizing agent. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds regardless of the surface or the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the water-soluble ethylene-based unsaturated monomer. As a non-limiting example, the internal cross-linking agent may be a multifunctional cross-linking agent such as N,N'-methylenebisacrylamide, trimethylolpropane tri(meth)acrylate, ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth) acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, or ethylene carbonate, and theses may be used alone or in combination of two or more. However, the present disclosure is not limited thereto. Preferably, polyethylene glycol di(meth)acrylate may be used.

The cross-linking polymerization of the water-soluble ethylene-based unsaturated monomer in the presence of the internal cross-linking agent may be performed by thermal polymerization, photopolymerization or hybrid polymerization in the presence of a polymerization initiator with or without a thickener, a plasticizer, a preservation stabilizer, an antioxidant, etc., but the specific details will be described later.

In the monomer composition, the internal cross-linking agent may be used in an amount of 0.01 to 5 parts by weight based on 100 parts by weight of the water-soluble ethylene-based unsaturated monomer. For example, the internal cross-linking agent may be used in an amount of 0.01 parts by weight or more, 0.05 parts by weight or more, or 0.1 parts by weight or more, and 5 parts by weight or less, 3 parts by weight or less, 2 parts by weight or less, 1 parts by weight or less, or 0.7 parts by weight or less based on 100 parts by weight of the water-soluble ethylene-based unsaturated monomer. When too little internal cross-linking agent is used, cross-linking does not occur sufficiently, and thus it may be difficult to achieve strength above an appropriate level, and when too much internal cross-linking agent is used, the internal cross-linking density increases, and thus it may be difficult to achieve a desired level of water retention capacity.

In addition, the polymerization initiator may be properly selected depending on the polymerization method. In the case of a thermal polymerization, a thermal polymerization initiator is used, and in the case of a photopolymerization, a photopolymerization initiator is used. Further, in the case of a hybrid polymerization method (a method using both heat and light), all of the thermal polymerization initiator and the photopolymerization initiator can be used. However, even by the photopolymerization method, a certain amount heat is generated by UV radiation and the like, and some heat occurs as the polymerization reaction, an exothermal reaction, progresses. Therefore, the composition may additionally include the thermal polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, specific examples of the acyl phosphine include diphenyl(2,4,6-trimethylbenzoyl) phosphine oxide, phenylbis(2,4,6-trimethylbenzoyl)phosphine oxide, ethyl(2,4,6-trimethylbenzoyl)phenylphosphinate, and the like. More various photopolymerization initiators are well disclosed in "UV Coatings: Basics, Recent Developments and New Application (Elsevier, 2007)" written by Reinhold Schwalm, p 115, and the present disclosure is not limited thereto.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis(2-amidinopropane) dihydrochloride, 2,2-azobis-(N,N-dimethylene)isobutyramidine dihydrochloride, 2-(carbamoylazo)isobutylonitril, 2,2-azobis [2-(2-imidazolin-2-yl)propane]dihydrochloride, 4,4-azobis-(4-cyanovaleric acid), and the like may be used as examples of the azo-based initiators. More various thermal polymerization initiators are well disclosed in 'Principle of Polymerization (Wiley, 1981)' written by Odian, p 203, and the present disclosure is not limited thereto.

The polymerization initiator may be used in an amount of 2 parts by weight or less based on 100 parts by weight of the water-soluble ethylene-based unsaturated monomer. When the concentration of the polymerization initiator is excessively low, the polymerization rate becomes slow, and a large amount of residual monomers may be extracted from the final product. Conversely, when the concentration of the polymerization initiator is higher than the above range, polymer chains forming a network are shortened, so that the content of extractable components increases and absorbency under pressure decreases, thereby lowering physical properties of the polymer.

The monomer composition may further include an additive such as a thickener, a plasticizer, a preservation stabilizer, an antioxidant, and the like, if necessary.

In addition, the monomer composition containing the monomer may be, for example, in the form of a solution dissolved in a solvent such as water. The solid content of the monomer composition in a solution state, that is, the concentration of the monomer, the internal cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

Meanwhile, the cross-linking polymerization of a water-soluble ethylene-based unsaturated monomer having at least partially neutralized acidic groups may be performed without any particular limitation, as long as the hydrogel polymer can be formed by thermal polymerization, photopolymerization, or hybrid polymerization.

Specifically, the polymerization method is largely divided into thermal polymerization and photopolymerization depending on an energy source of the polymerization. In the case of thermal polymerization, it is generally carried out in a reactor equipped with an agitation spindle, such as a kneader. In the case of photopolymerization, it is generally carried out in a reactor equipped with a movable conveyor belt, or in a container with a flat bottom. However, the above-mentioned polymerization method is merely an example, and the present disclosure is not limited thereto.

For example, a hydrogel polymer may be obtained by supplying hot air to the reactor with an agitation spindle such as a kneader or heating the reactor to perform thermal polymerization. The hydrogel polymer thus obtained may have a size of several centimeters to several millimeters, according to the shape of the agitation spindle equipped in the reactor. Specifically, the size of the obtained hydrogel polymer may vary depending on the concentration and injection speed of the monomer composition injected thereto, and a hydrogel polymer having a weight average particle diameter of 2 to 50 mm may be obtained.

Further, when the photopolymerization is carried out in a reactor equipped with a movable conveyor belt or in a container with a flat bottom as described above, the obtained hydrogel polymer may be usually a sheet-like hydrogel polymer having a width of the belt. In this case, the thickness of the polymer sheet may vary depending on the concentration, injection speed or injection amount of the monomer composition to be injected, but usually, it is preferable to feed the monomer composition such that a sheet-like polymer having a thickness of about 0.5 to about 5 cm can be obtained. When the monomer mixture is fed such that the thickness of the sheet-like polymer becomes too thin, the production efficiency is low, which is undesirable. When the thickness of the sheet-like polymer is greater than 5 cm, the polymerization reaction cannot be evenly carried out over the entire thickness because of the excessive thickness.

At this time, the hydrogel polymer thus obtained may have a moisture content of 30 to 70 wt %. For example, the moisture content of the hydrogel polymer may be 35 wt % or more, 40 wt % or more, 45 wt % or more, or 50 wt % or more, and 70 wt % or less, 65 wt % or less, or 60 wt % or less. When the moisture content of the hydrogel polymer is too low, it is difficult to secure an appropriate surface area in the subsequent pulverization step, and thus the pulverization may not be effective. When the moisture content of the hydrogel polymer is too high, the pressure received in the subsequent pulverization step increases, and thus the pulverization may be difficult to proceed to a desired particle size.

Meanwhile, the "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated by the weight loss due to moisture evaporation from the polymer in the process of increasing the temperature of the crumb polymer for drying through infrared heating. At this time, the drying conditions for measuring the moisture content are as follows: the temperature is increased to about 180° C. and maintained at 180° C., and the total drying time is 40 min including 5 min of a heating step.

The hydrogel polymer formed by Step 1 may have a three-dimensional network structure in which main chains formed by polymerization of the water-soluble ethylene-based unsaturated monomers are cross-linked by the internal cross-linking agent. When the hydrogel polymer has a three-dimensional network structure, water retention capacity and absorbency under pressure, which are general physical properties of the super absorbent polymer, can be significantly improved compared to the case of having a two-dimensional linear structure that is not further cross-linked by the internal cross-linking agent.

(Step 2)

The above step is to mix the hydrogel polymer with the carboxylic acid-based additive, followed by pulverization to prepare a pulverized product containing hydrous super absorbent polymer particles and the additive. In this step, the hydrogel polymer is not chopped, but pulverized to particles that can be applied to the final product, thereby preparing hydrous super absorbent polymer particles.

At this time, the carboxylic acid-based additive is at least one selected from the group consisting of a carboxylic acid represented by the Chemical Formula 1 and a metal salt thereof. Specifically, the carboxylic acid-based additive is at least one selected from the group consisting of a carboxylic acid represented by the Chemical Formula 1, an alkali metal salt of a carboxylic acid represented by the Chemical Formula 1, and an alkaline earth metal salt of a carboxylic acid represented by the Chemical Formula 1. More specifically, the carboxylic acid-based additive is one of a carboxylic acid represented by the Chemical Formula 1, an alkali metal salt of a carboxylic acid represented by the Chemical Formula 1, and an alkaline earth metal salt of a carboxylic acid represented by the Chemical Formula 1.

In the Chemical Formula 1, A is a hydrophobic moiety and may be a linear or branched alkyl group having 5 to 21 carbon atoms. However, the case where A is a linear alkyl group is more advantageous in terms of suppressing agglomeration of pulverized particles and improving dispersibility. When A is an alkyl group having less than 5 carbon atoms, there is a problem in that the chain is short, so that the agglomeration of pulverized particles cannot be effectively controlled. When A is an alkyl group having more than 21 carbon atoms, mobility of the additive may be reduced, so that the carboxylic acid-based additive may not be effectively mixed with the hydrogel polymer and the cost of the composition may increase due to an increase in the cost of the additive.

Specifically, in the Chemical Formula 1, A may be linear alkyl having 5 to 21 carbon atoms such as n-pentyl, n-hexyl, n-heptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, n-octadecanyl, n-nonadecanyl, n-icosanyl, or n-heneicosanyl.

More specifically, A may be linear alkyl having 6 to 18 carbon atoms. For example, A may be —$C_6H_{13}$, —$C_{11}H_{23}$, —$C_{12}H_{25}$, —$C_{17}H_{35}$, or —$C_{18}H_{37}$.

In addition, part ($B_1$-$B_2$) of the Chemical Formula 1 improves adsorption performance with respect to the polymer surface, which may be insufficient only with the part C. When the number of carbon atoms of $B_2$ is 3 or more, the distance between part $B_1$ and part C increases, and the adsorption performance with respect to the hydrogel polymer may be deteriorated.

Herein, $R_1$ and $R_2$ may each independently be $C_1$ to $C_4$ linear or branched alkyl having 1 to 4 carbon atoms. More specifically, $R_1$ and $R_2$ may each independently be methyl, ethyl, propyl, isopropyl, butyl, isobutyl, sec-butyl, or tert-butyl. Since the additive can be adsorbed on the super absorbent polymer particles, it is advantageous that the molecular structure of the additive is not bulky, and thus both $R_1$ and $R_2$ may be methyl.

In addition, n of the Chemical Formula 1 may be 1, 2, or 3. More specifically, n, which means the number of ($B_1$-$B_2$), is preferably 1, considering that the part ($B_1$-$B_2$) is for reinforcing adsorption performance with respect to part C and how long a molecular length is required in order for the carboxylic acid-based additive to be effectively adsorbed on the hydrogel polymer.

Specifically, in the Chemical Formula 1, $B_1$ may be

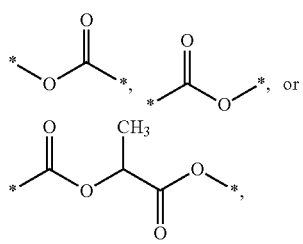

wherein * is a bonding site with a neighboring atom.

For example, $B_1$ may be

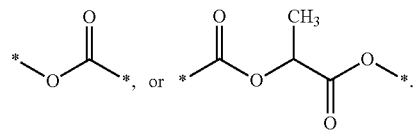

In addition, in the Chemical Formula 1, $B_2$ may be

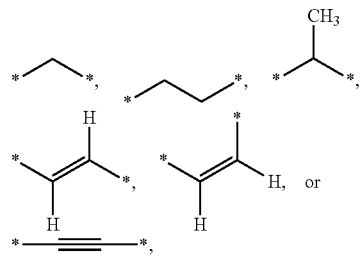

wherein * is a bonding site with a neighboring atom. At this time, in order to improve adsorption performance of the additive with respect to the cross-linked polymer together with part C, $B_2$ is preferably

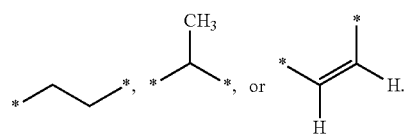

In addition, in the Chemical Formula 1, part C is a carboxyl group (COOH) as a hydrophilic moiety, and when the carboxylic acid-based additive is a salt, the hydrophilic moiety is a carboxylate group (COO$^-$).

In other words, the carboxylic acid-based additive may be a compound represented by the following Chemical Formula 1a:

[Chemical Formula 1a]

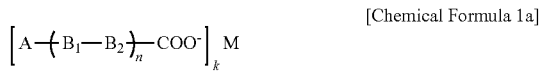

in Chemical Formula 1a,
M is H$^+$, a monovalent cation of an alkali metal, or a divalent cation of an alkaline earth metal,
k is 1 if M is H$^+$ or a monovalent cation of an alkali metal, and 2 if it is a divalent cation of an alkaline earth metal, and
descriptions of A, $B_1$, $B_2$ and n are as defined in the Chemical Formula 1.

More specifically, when the carboxylic acid-based additive is an alkali metal salt of the carboxylic acid represented by the Chemical Formula 1, the additive may be represented by the following Chemical Formula 1':

[Chemical Formula 1']

in Chemical Formula 1',

M$_1$ is an alkali metal such as sodium or potassium, and descriptions of A, B$_1$, B$_2$ and n are as defined in the Chemical Formula 1.

In addition, when the carboxylic acid-based additive is an alkaline earth metal salt of the carboxylic acid represented by the Chemical Formula 1, the additive may be represented by the following Chemical Formula 1":

[Chemical Formula 1"]

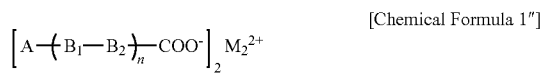

in Chemical Formula 1", M$_2$ is an alkaline earth metal such as calcium, and descriptions of A, B$_1$, B$_2$ and n are as defined in the Chemical Formula 1.

For example, the carboxylic acid-based additive may be any one carboxylic acid selected from the group consisting of:

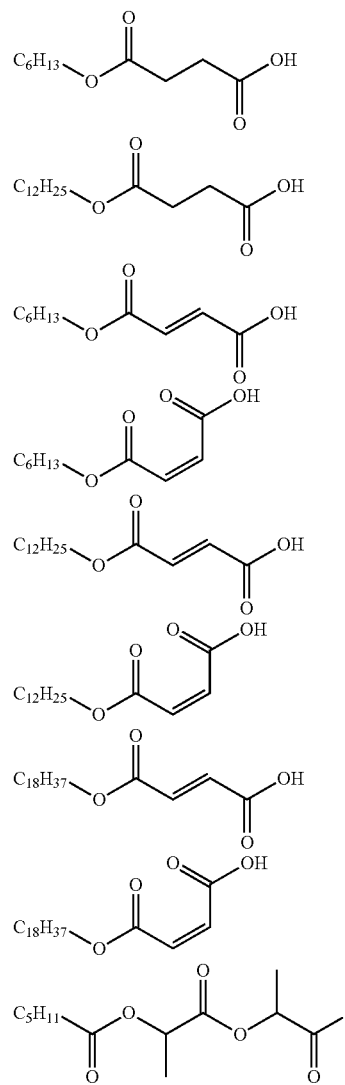

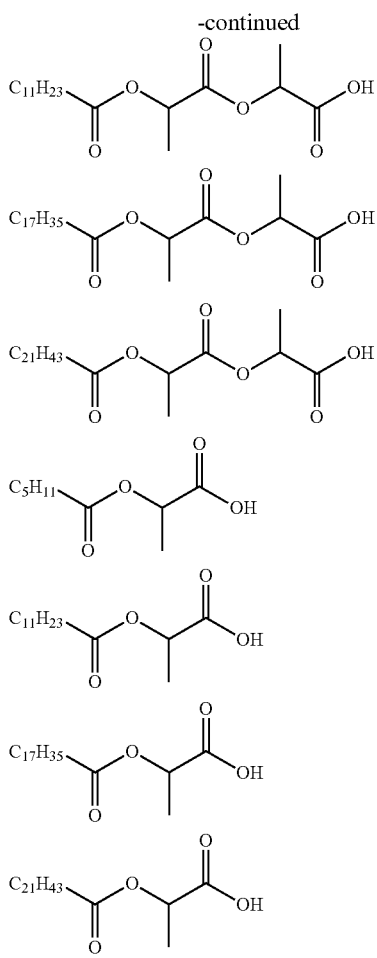

Alternatively, the carboxylic acid-based additive may be any one alkali metal salt selected from the group consisting of:

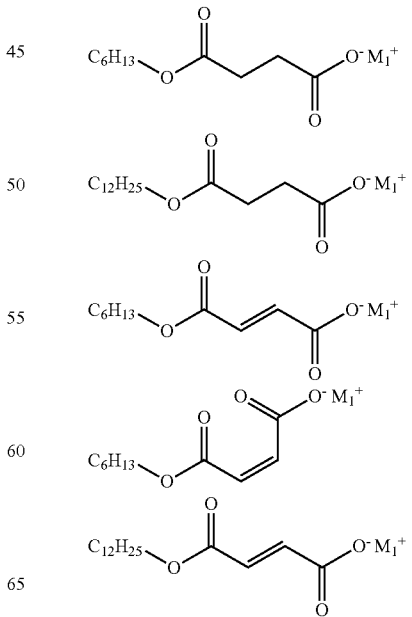

-continued
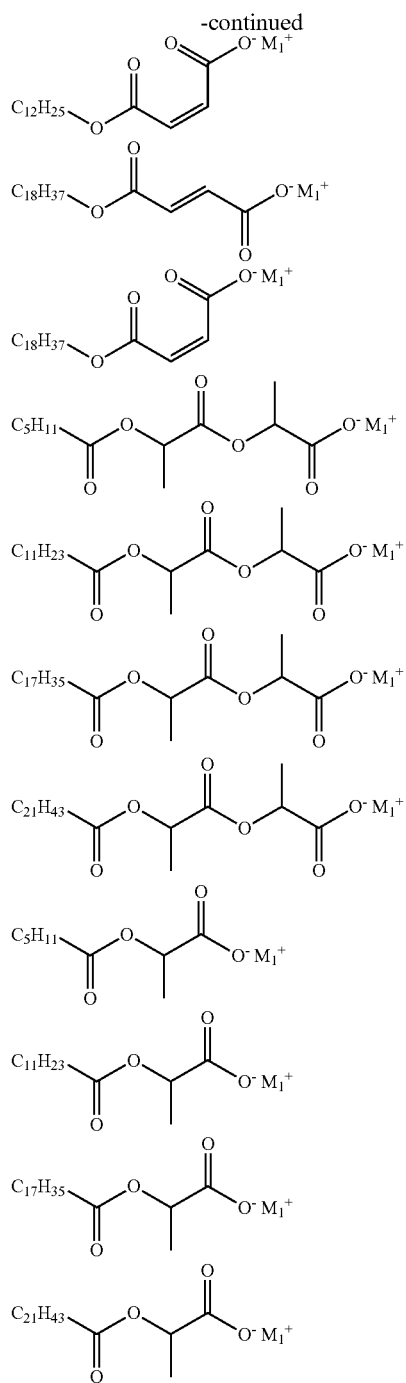
In the above,
M₁ is each independently an alkali metal.
Alternatively, the carboxylic acid-based additive may be any one alkaline earth metal salt selected from the group consisting of:
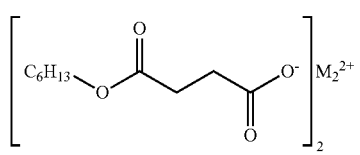
-continued
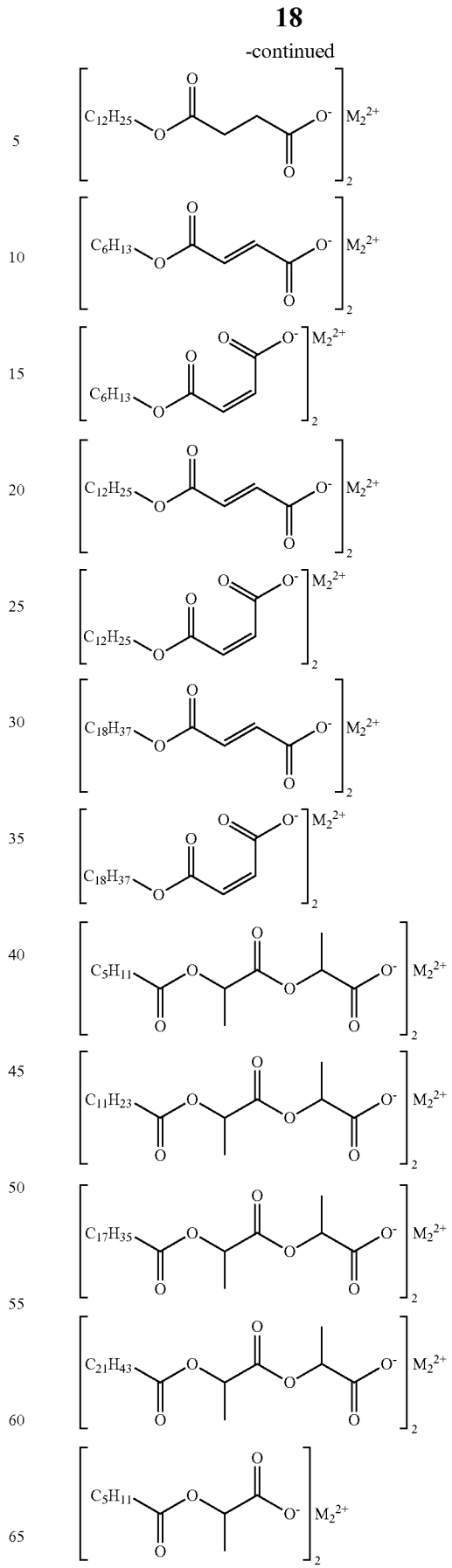

-continued

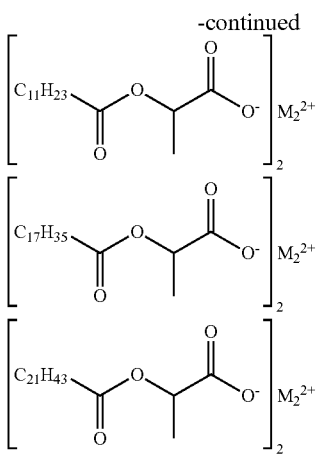

In the above,

M₂ is each independently an alkaline earth metal.

For example, the carboxylic acid-based additive may be any one of compounds represented by the following Chemical Formulae 1-1 to 1-7, but is not limited thereto:

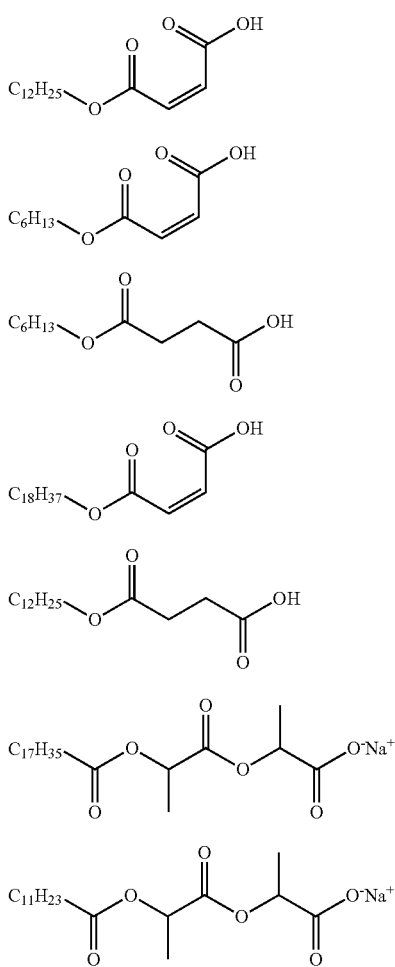

Meanwhile, the carboxylic acid-based additive may be used in an amount of about 0.01 to about 1 parts by weight based on 100 parts by weight of the hydrogel polymer. When too little additive is used, the additive may not be evenly adsorbed on the surface of the hydrogel polymer, resulting in re-agglomeration of the particles after pulverization, and when too much additive is used, the overall physical properties of the final super absorbent polymer may decrease. For example, the carboxylic acid-based additive may be used in an amount of 0.01 parts by weight or more, 0.015 parts by weight or more, or 0.1 parts by weight or more, and 1 parts by weight or less, 0.7 parts by weight or less, 0.5 parts by weight or less, or 0.4 parts by weight or less based on 100 parts by weight of the hydrogel polymer.

The method of mixing the additive with the hydrogel polymer is not particularly limited, and may be appropriately selected as long as it is a method capable of evenly mixing the additive with the hydrogel polymer. Specifically, the additive may be dry-mixed, dissolved in a solvent and then mixed, or melted and then mixed.

For example, the additive may be mixed in the form of a solution dissolved in a solvent. At this time, any type of inorganic solvent or organic solvent may be used without limitation, but water is most preferable for the solvent in consideration of the ease of drying and the cost of solvent recovery system. In addition, a method of putting the additive in the form of a solution and the hydrogel polymer in a reaction tank for mixing, a method of spraying the solution after putting the hydrogel polymer in a mixer, a method of continuously supplying the hydrogel polymer and the solution to a continuously operating mixer for mixing, or the like may be used.

A pulverized product containing hydrous super absorbent polymer particles and the additive may be prepared by mixing the hydrogel polymer with the additive, followed by pulverization. Specifically, the pulverization step may be performed so that the pulverized hydrous super absorbent polymer particles have a normal particle size.

Herein, the pulverization may be performed in a wet manner. Specifically, as the carboxylic acid-based additive is mixed in a solution state dissolved in a solvent, for example, water, the hydrogel polymer may be uniformly pulverized to a desired particle size without generating fine powder under wet conditions.

In addition, any one selected from the group consisting of a vertical pulverizer, a turbo cutter, a turbo grinder, a rotary cutter mill, a cutter mill, a disc mill, a shred crusher, a crusher, a chopper, and a disc cutter may be used as the pulverizing machine.

Among them, the pulverization may be performed by a chopper, more specifically by a meat chopper.

At this time, the meat chopper includes a perforated plate, and the perforated plate may have a plurality of fine chopping holes having a certain size. In other words, it can be seen that the pulverization is performed by pushing the hydrogel polymer mixed with the additive such that the hydrogel polymer is pulverized while passing through the fine chopping holes of perforated plates.

In other words, the pulverization may be performed by pushing the hydrogel polymer mixed with the carboxylic acid-based additive into a perforated plate provided with a plurality of fine chopping holes having a certain size. At this time, an extruder may be used to push out the hydrogel polymer. For example, a single- or multiple-screw extruder may be used.

In addition, the pulverization may be performed while passing through two or more perforated plates. For this, a meat chopper including a chopping module in which two or more perforated plates are connected in series may be used, or two or more meat choppers including one perforated plate may be connected in series and used.

For example, in the case of using a meat chopper having two or more perforated plates, the perforated plates may be arranged in series in the order of screw-knife-perforated plate-knife-perforated plate, and at this time, a distance between the perforated plate and the knife is preferably 1 mm or less to increase chopping efficiency.

In addition, a hole size (meaning a diameter of the hole) of the fine chopping holes in the perforated plate may be 0.2 mm to 6 mm. For example, it may be 0.5 mm or more, 0.7 mm or more, or 1 mm or more, and 5 mm or less, 4 mm or less, 3.5 mm or less, 3 mm or less, or 2 mm or less. The smaller the hole size of the fine chopping holes provided in the perforated plate, the smaller the size of the pulverized hydrous super absorbent polymer particles, so that the drying speed increases, thereby increasing the drying efficiency. When the hole size of the fine chopping holes is too small, excessive pressure is generated inside the chopper, so that the hydrogel polymer cannot be discharged through the perforated plate and the device may be stopped.

Therefore, the term "hydrous super absorbent polymer particles" as used herein may be understood to mean a hydrogel polymer pulverized while passing through fine chopping holes provided in a perforated plate of a meat chopper, that is, a hydrogel polymer pulverized while passing through fine chopping holes having a hole size of 0.2 mm to 5 mm Herein, the hydrous super absorbent polymer particles contained in the pulverized product are particles having a moisture content of about 30 wt % or more. Since they are particles in which the hydrogel polymer is pulverized into particles without a drying process, they may have a moisture content of 30 to 70 wt %, like the hydrogel polymer.

Meanwhile, at least some of the additive contained in the pulverized product may be present on a surface of the hydrous super absorbent polymer particles. Herein, "at least some of the additive is present on a surface of the hydrous super absorbent polymer particles" means that at least some of the additive is adsorbed or bonded on the surface of the hydrous super absorbent polymer particles. Specifically, the additive may be physically or chemically adsorbed on the surface of the super absorbent polymer. More specifically, the hydrophilic functional group of the additive may be physically adsorbed on the hydrophilic moiety of the surface of the super absorbent polymer by an intermolecular force such as dipole-dipole interaction. In this way, the hydrophilic moiety of the additive is physically adsorbed on the surface of the super absorbent polymer particles to surround the surface, and the hydrophobic moiety of the additive is not adsorbed on the surface of the polymer particles, so the polymer particles may be coated with the additive in the form of a micelle structure. This is because the carboxylic acid-based additive is not added during the polymerization process of the water-soluble ethylene-based unsaturated monomer, but is added after the polymer is formed. Accordingly, the phenomenon of re-agglomeration between the hydrous super absorbent polymer particles may be further suppressed, compared to the case where the additive is added during the polymerization process and present inside the polymer.

(Step 3)

The above step is to dry the pulverized product with a paddle-type dryer to prepare super absorbent polymer particles. The above drying step may be performed such that a moisture content of hydrous super absorbent polymer particles prepared in Step 2 is about 10 wt % or less, specifically, about 0.01 to about 10 wt %. Accordingly, the dried product prepared by the above drying step contains a plurality of super absorbent polymer particles having a moisture content of about 10 wt % or less.

Meanwhile, drying of the pulverized product is performed using a paddle-type dryer, as described above.

The paddle-type dryer is a kind of agitated dryer that has one or more rotating shafts arranged in a horizontal direction, and a plurality of paddles are attached to the rotating shaft. As the rotating shaft rotates, the material injected into the dryer is dried. At this time, it is characterized in that a plate-shaped blade positioned horizontally at the end of each paddle can agitate the dried product up-down and left-right.

In addition, in the paddle-type dryer, gas or hot air is not supplied into the dryer, but a heating medium such as heat transfer fluids is supplied to a rotating shaft attached with a dryer jacket and a paddle. Accordingly, drying in the paddle-type dryer is performed in an indirect drying manner in which heat is supplied from the dryer jacket or the paddle wall to the material to be dried by heat transfer. This has advantages of preventing deterioration that may occur due to a rapid temperature increase or uneven drying of the material to be dried and preventing product deformation, compared to direct drying in which hot air is supplied directly to the material to be dried and then dried in a belt-type dryer.

Therefore, a dried product in the form of particles uniformly dried to the inside with suppressed thermal change can be obtained by drying the hydrous super absorbent polymer particles prepared in Step 2 in an indirect drying manner with a paddle-type dryer, compared to a product prepared by drying in a direct drying manner in which gas or hot air is supplied directly into the dryer.

For example, the paddle-type dryer may have two rotating shafts. Each of the two rotating shafts may rotate at the same or different speeds.

Preferably, the rotating shaft provided in the paddle-type dryer may rotate at 1 to 120 rpm, respectively. When the rotating shaft of the paddle-type dryer rotates too slowly, it may be difficult to suppress agglomeration between particles, and when the rotating shaft of the paddle-type dryer rotates too fast, excessive stirring occurs and thus the particles may be pulverized to an unwanted size, which is not desirable.

In addition, throughput per unit volume of the pulverized product in the paddle-type dryer may be 40 to 80%. This is significantly higher than that of a dryer such as a steam tube dryer or a rotary kiln dryer having throughput per unit volume of 10 to 30%.

In addition, drying using the paddle-type dryer may be performed at a temperature of 80° C. to 250° C. for 10 minutes to 3 hours.

Specifically, the temperature in the paddle-type dryer may be about 80° C. to about 250° C. When the temperature in the dryer is too low, the drying time may become excessively long, and when the drying temperature is too high, only the surface of the polymer is dried and physical properties of the final super absorbent polymer may decrease. Therefore, the drying process may be preferably performed at a temperature in the dryer of about 100° C. to about 240° C., more preferably at a temperature of about 110° C. to about 220° C.

Furthermore, the drying time may be about 10 minutes to about 3 hours in consideration of process efficiency. For example, the drying may be performed for about 10 minutes to about 150 minutes, about 10 minutes to about 140 minutes, or about 10 minutes to about 120 minutes Further, the dried product prepared in Step 3 may contain 90 wt % or more, preferably 93 wt % or more of super absorbent polymer particles having a particle diameter of 2000 μm or less based on the total weight. In addition, among them, super absorbent polymer particles having a particle diameter of 1400 μm or less may be included in an amount of 40 wt % or more based on the total weight of the dried product.

More specifically, the super absorbent polymer particles are obtained by drying the moisture from the hydrous super absorbent polymer particles pulverized while passing through fine chopping holes having a hole size of 0.2 mm to 5 mm in Step 2, and may be in the form of primary particles in which a plurality of particles are not physically or chemically agglomerated or attached. Accordingly, it can be seen that the super absorbent polymer particles prepared in Step 3 do not have a large change in particle size compared to the hydrous super absorbent polymer particles pulverized in Step 2.

Particularly, in the case of using fine chopping holes having a hole size of more than 1 mm and 2 mm or less in Step 2, the dried product prepared in Step 3 may contain 60 wt % or more of super absorbent polymer particles having a particle diameter of 1400 μm or less based on the total weight. In the case of using fine chopping holes having a hole size of 0.2 mm to 1 mm in Step 2, the dried product prepared in Step 3 may contain 90 wt % or more, 95 wt % or more, preferably 98 wt % or more of super absorbent polymer particles having a particle diameter of 1400 μm or less based on the total weight.

Through the prepation method of a super absorbent polymer according to an embodiment in which Step 2 of pulverizing a hydrogel polymer after mixing with the carboxylic acid-based additive and Step 3 of drying the pulverized product containing hydrous super absorbent polymer particles prepared in Step 2 using a paddle-type dryer are combined, it is possible to dry the pulverized product in a short time with high throughput per unit volume without agglomeration between hydrous super absorbent polymer particles, thereby preparing a dried product in the form of particles rather than in the form of a plate or a lump of particles.

Meanwhile, a step of classifying the super absorbent polymer particles according to the particle size may be further included after Step 3 and before Step 4 to be described later. The super absorbent polymer particles may be classified into normal particles having a particle diameter of about 150 μm to about 850 μm, fine powder having a particle size of less than about 150 μm, and particles having a particle size of more than about 850 μm using a ASTM standard mesh. In this case, the particle size may be measured in accordance with EDANA WSP 220.3 by the European Disposables and Nonwovens Association (EDANA).

(Step 4)

The above step is to finely pulverize particles having a particle diameter of more than 850 μm among the super absorbent polymer particles contained in the dried product prepared in Step 3. In the above step, particles having a particle diameter of more than 850 μm are pulverized to have a particle diameter of about 150 μm to about 850 μm.

The fine pulverization may be performed in a dry manner. That is, among the super absorbent polymer particles prepared in Step 3, particles having a particle diameter of more than 850 μm may be pulverized into small particles by mechanical energy.

Herein, a pulverizing machine used for pulverization may be a pin mill, a hammer mill, a screw mill, a roll mill, a disc mill, or a jog mill, but the present disclosure is not limited thereto.

The super absorbent polymer prepared as described above may contain 90 wt % or more, 92 wt % or more, or 93 wt % or more of super absorbent polymer particles having a particle diameter of 150 μm to 850 μm, that is, normal particles, based on the total weight.

In addition, the super absorbent polymer may contain less than about 10 wt %, specifically less than about 8 wt %, more specifically less than about 7 wt % of fine powder having a particle diameter of less than 150 μm based on the total weight.

(Surface Cross-Linking Step)

Thereafter, if necessary, a step of preparing a super absorbent polymer having a surface cross-linked layer formed on at least part of a surface by cross-linking the surface of the prepared super absorbent polymer in the presence of a surface cross-linking agent may be further included.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like.

This surface cross-linking agent may be used in an amount of about 0.001 to about 5 parts by weight based on 100 parts by weight of the super absorbent polymer particles. For example, the surface cross-linking agent may be used in an amount of 0.005 parts by weight or more, 0.01 parts by weight or more, or 0.05 parts by weight or more, and 5 parts by weight or less, 4 parts by weight or less, or 3 parts by weight or less based on 100 parts by weight of the super absorbent polymer particles. By adjusting the content of the surface cross-linking agent within the above-described range, a super absorbent polymer having excellent absorption properties can be prepared.

In addition, the method of mixing the surface cross-linking agent with the super absorbent polymer is not particularly limited. For example, a method of adding the surface cross-linking agent and the super absorbent polymer in a reactor for mixing, a method of spraying the surface cross-linking agent onto the super absorbent polymer, or a method of mixing the super absorbent polymer and the surface cross-linking agent while continuously providing them to a continuously operating mixer may be used.

The surface cross-linking process may be performed at a temperature of about 80° C. to about 250° C. More specifically, the surface cross-linking process may be performed at a temperature of about 100° C. to about 220° C., or about 120° C. to about 200° C., for about 20 minutes to about 2 hours, or about 40 minutes to about 80 minutes. When the above-described surface cross-linking conditions are satisfied, the surface of the super absorbent polymer particles is sufficiently cross-linked to increase absorbency under pressure.

The heating means for surface cross-linking is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present invention is not limited thereto.

In addition, the super absorbent polymer prepared by the above method may further include a compound formed by decomposing an ester bond of $B_1$ in the process of drying after the additive is pulverized with the hydrogel polymer, in addition to the super absorbent polymer particles and the carboxylic acid-based additive.

Specifically, when the additive is a compound in which n is 1 and $B_1$ is —OCO—, the super absorbent polymer may further include an alcohol having an A-OH structure and a compound having a HOOC—$B_2$—C structure.

In addition, when the additive is a compound in which n is 1 and $B_1$ is —COO—, the super absorbent polymer may further include a carboxylic acid having an A-COOH structure and a compound having a HO—$B_2$—C structure.

In addition, when the additive is a compound in which n is 1 and $B_1$ is —COOCH($R_1$)COO—, the super absorbent polymer may further include a carboxylic acid having an A-COOH structure and a compound having a HOCH($R_1$)COO—$B_2$—C structure.

As the super absorbent polymer further includes the compound formed by decomposing an ester bond in the additive molecule, mobility of the additives is increased, and a phenomenon of re-agglomeration after pulverization can be further prevented.

In addition, the super absorbent polymer may have centrifuge retention capacity (CRC) of 50 g/g or more, 53 g/g or more, or 54 g/g or more, and 60 g/g or less, when measured in accordance with the EDANA method WSP 241.3.

In addition, the super absorbent polymer may have extractable contents of 15 wt % or less, 14.5 wt % or less, or 12 wt % or less, when measured in accordance with the EDANA method WSP 270.2. In addition, as the lower extractable contents can be evaluated as the better, the lower limit is theoretically 0 wt %, but may be 5 wt % or more, 8 wt % or more, or 10 wt % or more.

In addition, the super absorbent polymer may have a vortex time of 70 seconds or less, 68 seconds or less, or 66 seconds or less at 24.0° C. In addition, the lower vortex time can be evaluated as the better, and the vortex time may be 40 seconds or more, or 50 seconds or more.

In addition, the super absorbent polymer may have a moisture content of 3 wt % or less, 2.5 wt % or less, or 2 wt % or less.

Hereinafter, the present invention will be described in more detail with reference to examples. However, these examples are for illustrative purposes only, and the invention is not intended to be limited by these examples.

EXAMPLES—PREPARATION OF SUPER ABSORBENT POLYMER

Example 1

(Step 1)
100 g (1.388 mol) of acrylic acid, 0.16 g of polyethylene glycol diacrylate (Mn=508) as an internal cross-linking agent, 0.008 g of diphenyl (2,4,6-trimethylbenzoyl)phosphine oxide as a photopolymerization initiator, 0.12 g of sodium persulfate as a thermal polymerization initiator and 123.5 g of a 32% caustic soda solution were mixed in a 3 L glass container equipped with a stirrer and a thermometer at room temperature to prepare a monomer composition (degree of neutralization of acrylic acid: 70 mol %, solid content: 45 wt %).

Thereafter, the monomer composition was supplied at 500 to 2000 mL/min on a conveyor belt in which a belt having a width of 10 cm and a length of 2 m rotates at a speed of 50 cm/min. And, at the same time as the monomer composition was supplied, ultraviolet rays having an intensity of 10 mW/cm² were irradiated to perform a polymerization reaction for 60 seconds, thereby obtaining a hydrogel polymer having a moisture content of 55 wt %.

(Step 2)
Subsequently, sodium stearoyl-2-lactylate (Almax-6900, manufactured by Ilshinwells) represented by the following Chemical Formula 1-6 was added to the hydrogel polymer obtained by the above polymerization reaction in the form of an aqueous solution in hot water such that the content was 0.3 parts by weight based on 100 parts by weight of the hydrogel polymer. Then, the mixture was pulverized using a meat chopper including a plurality of fine chopping holes having a hole size of 3 mm. Herein, a moisture content of the hydrous super absorbent polymer particles contained in the pulverized product was 55 wt %.

[Chemical Formula 1-6]

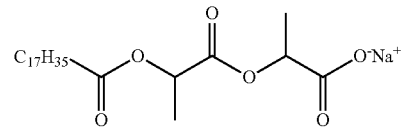

(Step 3)
Thereafter, the pulverized product was put into a two-axis paddle-type dryer (product name: paddle dryer NPD-1.6W, manufacturer: NARA MACHINERY CO., LID) with a paddle wing diameter of 160 mm, a total length of 1860 mm, an effective volume of 77 L, and a heat transfer area of 1.7 m², and then dried continuously while stirring the rotating shaft at 30 rpm. At this time, the temperature inside the paddle dryer was maintained at 200° C. during drying, and throughput per unit volume was 80%. The super absorbent polymer particles obtained after drying were classified using a ASTM standard mesh, and the results are shown in Table 1 below. Referring to Table 1, it can be seen that the dried product contains 93 wt % of super absorbent polymer particles having a particle diameter of 2000 μm or less based on the total weight, and 42.4 wt % of particles having a particle diameter of 1400 μm or less.

(Step 4)
Particles with a particle diameter of more than 850 μm classified through above #20 mesh among the super absorbent polymer particles prepared in Step 3 were finely pulverized using a roll mill (66 F Gran-U-Lizer, manufactured by MPE) with a roll gap of 0.08/0.04 mm between first and second stages, and a final super absorbent polymer was prepared. The prepared particles were classified again using a ASTM standard mesh, and then a particle size distribution of the finally prepared super absorbent polymer particles including all the super absorbent polymer particles having a particle diameter of 850 μm or less prepared in Step 3 was confirmed. The results are shown in Table 1. Referring to Table 1, it can be seen that the finally prepared super absorbent polymer contains 96.2 wt % of normal particles (super absorbent polymer particles having a particle diameter of 150 μm to 850 μm) based on the total weight.

Example 2

A super absorbent polymer was prepared in the same manner as in Example 1, except that a meat chopper including a perforated plate having a plurality of fine chopping holes having a hole size of 2 mm was used in step 2. At this time, classification was performed in Steps 3 and 4 as in Example 1 in order to confirm the particle diameter of the obtained super absorbent polymer particles, and the results are shown in Table 1.

Referring to Table 1, the dried product prepared in Step 3 of Example 2 contains 98.5 wt % of super absorbent polymer particles having a particle diameter of 2000 μm or less based on the total weight, and 66.8 wt % of particles having a particle diameter of 1400 μm or less. In addition, it can be seen that the super absorbent polymer finally prepared in Example 2 contains 94.7 wt % of normal particles based on the total weight.

Example 3

A super absorbent polymer was prepared in the same manner as in Example 1, except that a meat chopper including a perforated plate having a plurality of fine chopping holes having a hole size of 1 mm was used in step 2. At this time, classification was performed in Steps 3 and 4 as in Example 1 in order to confirm the particle diameter of the obtained super absorbent polymer particles, and the results are shown in Table 1.

Referring to Table 1, the dried product prepared in Step 3 of Example 3 contains 99.7 wt % of super absorbent polymer particles having a particle diameter of 2000 μm or less based on the total weight, and 98.1 wt % of particles having a particle diameter of 1400 μm or less. In addition, it can be seen that the super absorbent polymer finally prepared in Example 3 contains 97.2 wt % of normal particles based on the total weight.

Example 4

A super absorbent polymer was prepared in the same manner as in Example 1, except that the sodium stearoyl-2-lactylate represented by Chemical Formula 1-6 was used in an amount of 0.2 parts by weight based on 100 parts by weight of the hydrogel polymer and a meat chopper including a perforated plate having a plurality of fine chopping holes having a hole size of 2 mm was used in step 2. At this time, classification was performed in Steps 3 and 4 as in Example 1 in order to confirm the particle diameter of the obtained super absorbent polymer particles, and the results are shown in Table 1.

Referring to Table 1, the dried product prepared in Step 3 of Example 4 contains 99.2 wt % of super absorbent polymer particles having a particle diameter of 2000 μm or less based on the total weight, and 82.1 wt % of particles having a particle diameter of 1400 μm or less. In addition, it can be seen that the super absorbent polymer finally prepared in Example 4 contains 93.8 wt % of normal particles based on the total weight.

Comparative Example 1

(Polymerization) A hydrogel polymer having a moisture content of 55 wt % was obtained in the same manner as in Example 1.

(Chopping) Subsequently, the hydrogel polymer obtained by the polymerization reaction was mixed with the same amount of water as in Example 1, and chopped using a meat chopper having a perforated plate with a plurality of fine chopping holes having a hole size of 16 mm.

(Drying) Thereafter, the chopped hydrogel polymer was dried for 40 minutes while being supplied to a belt-type dryer (manufactured by Okawara) capable of changing wind direction up and down with a width of 1600 mm and a length of 6200 mm at a flow rate of 200 kg/hr. At this time, the temperature of hot air supplied to the inside of the dryer was maintained at 180° C., and the hot air was supplied at 2.0 m/s. In addition, the dried product prepared in the above step was prepared in the form of a single plate, and classification was not possible because there was no dried product prepared in the form of particles.

(Coarse pulverization/classification/fine pulverization) The dried polymer was coarsely pulverized to a particle size of about 2 mm with a cutter mill (PULVERISETTE 19, manufactured by Fritsch). After the coarse pulverization was completed, the obtained particles were classified using a ASTM standard mesh, and the results are shown in Table 2 below. Thereafter, particles with a particle diameter of more than 850 μm classified through above #20 mesh among the classified particles were finely pulverized using a roll mill (66 F Gran-U-Lizer, manufactured by MPE) with a roll gap of 0.08/0.04 mm between first and second stages, and a final super absorbent polymer was prepared. The prepared particles were classified again using a ASTM standard mesh, and then a particle size distribution of the finally prepared super absorbent polymer particles including all the particles after pulverization was confirmed. And the results are shown in Table 2. Referring to Table 2, it can be seen that the finally prepared super absorbent polymer in the Comparative Example 1 contains 79.4 wt % of normal particles based on the total weight.

Comparative Example 2

An attempt was made to prepare a super absorbent polymer in the same manner as in Comparative Example 1, except that the paddle-type dryer used in Example 1 was used instead of the belt-type dryer in the drying step of Comparative Example 1. However, it was impossible to operate the dryer due to the occurrence of clumping inside the dryer.

Comparative Example 3

An attempt was made to prepare a super absorbent polymer in the same manner as in Example 3, except that a belt-type dryer capable of changing wind direction up and down with a width of 1600 mm and a length of 6200 mm was used instead of the paddle-type dryer in Step 3 of Example 3. However, since the inside of the dried product was not dried, a fine pulverization process could not proceed.

Comparative Example 4

An attempt was made to prepare a super absorbent polymer in the same manner as in Example 3, except that a fluidized bed dryer (drying temperature of 210° C. and superficial velocity of 1.2 m/s) having a diameter of 300 mm and an opening ratio of 8% provided with a perforated plate having a diameter of 0.8 mm was used instead of the paddle-type dryer in Step 3 of Example 3. However, it was impossible to prepare a super absorbent polymer due to the occurrence of a lump during drying.

Test Example 1

The results of classifying the super absorbent polymers prepared in Examples and Comparative Examples are shown in Tables 1 and 2.

TABLE 1

|  |  | Example 1 | | Example 2 | | Example 3 | | Example 4 | |
| --- | --- | --- | --- | --- | --- | --- | --- | --- | --- |
| Hole size of fine chopping holes of meat chopper (mm) | | 3 | | 2 | | 1 | | 2 | |
| Additive input[1] | | 0.3 | | 0.3 | | 0.3 | | 0.2 | |
| Type of dryer | | Paddle-type dryer | | Paddle-type dryer | | Paddle-type dryer | | Paddle-type dryer | |
| Mesh | Particle diameter (μm) | After drying[2] | After fine pulver-ization[3] | After drying[2] | After fine pulver-ization[3] | After drying[2] | After fine pulver-ization[3] | After drying[2] | After fine pulver-ization[3] |
| Above #5 | 4000 or more | 0.1 | 0.0 | 0.0 | 0.0 | 0.0 | 0.0 | 0.0 | 0.0 |
| #5-10 | 2000-4000 | 7.0 | 0.0 | 1.6 | 0.0 | 0.2 | 0.0 | 0.8 | 0.0 |
| #10-14 | 1400-2000 | 50.6 | 0.0 | 31.7 | 0.0 | 1.6 | 0.0 | 17.1 | 0.0 |
| #14-20 | 850-1400 | 35.8 | 0.3 | 40 | 0.2 | 55.4 | 0.3 | 43.6 | 0.2 |
| #20-30 | 600-850 | 5.1 | 25.3 | 11 | 17.4 | 27.9 | 27.5 | 10.6 | 13.7 |
| #30-50 | 300-600 | 1.3 | 60.8 | 13.1 | 66.3 | 13.5 | 61.3 | 19.9 | 66.2 |
| #50-100 | 150-300 | 0.2 | 10.1 | 2.2 | 11 | 1.2 | 8.4 | 6.4 | 13.9 |
| Below #100 (Fine powder) | Less than 150 | 0 | 3.6 | 0.5 | 5 | 0.1 | 2.6 | 1.6 | 6 |

[1] in parts by weight based on 100 parts by weight of the hydrogel polymer
[2] in wt % based on the total weight of the dried product
[3] in wt % based on the total weight of the finally prepared super absorbent polymer

TABLE 2

|  |  | Comparative Example 1 | | | Comparative Example 2 | Comparative Example 3 | Comparative Example 4 |
| --- | --- | --- | --- | --- | --- | --- | --- |
| Hole size of fine chopping holes of meat chopper (mm) | | 16 | | | 16 | 1 | 1 |
| Additive input[1] | | — | | | — | 0.3 | 0.3 |
| Type of dryer | | Belt-type dryer | | | Paddle-type dryer | Belt-type dryer | Fluidized bed dryer |
| Mesh | Particle diameter (μm) | After drying | After coarse pulver-ization[2] | After fine pulver-ization[3] | Dryer could not be operated due to clumping inside the dryer | Could not be finely pulverized due to undried parts inside the dried product | Lump occured during drying |
| Above #5 | 4000 or more | Prepared in a plate shape and could not be classified | 0.0 | 0.0 | | | |
| #5-10 | 2000-4000 | | 2.7 | 0.0 | | | |
| #10-14 | 1400-2000 | | 29.9 | 0.0 | | | |
| #14-20 | 850-1400 | | 21.7 | 0.0 | | | |
| #20-30 | 600-850 | | 8.5 | 8.4 | | | |
| #30-50 | 300-600 | | 15.2 | 50.3 | | | |
| #50-100 | 150-300 | | 9.9 | 20.7 | | | |
| Below #100 Fine powder content | Less than 150 | | 12.1 | 20.6 | | | |

[1] in parts by weight based on 100 parts by weight of the hydrogel polymer
[2] in wt % based on the total weight of the coarsely pulverized product
[3] in wt % based on the total weight of the finally prepared super absorbent polymer Referring to Tables 1 and 2, in the case of Examples in which a super absorbent polymer was prepared by adding the carboxylic acid-based additive during pulverization of the hydrogel polymer, clumping/agglomeration between hydrous super absorbent polymer particles was suppressed in the drying process, and thus drying is possible in a paddle-type dryer with high throughput per unit volume. In addition, the dried product dried through the paddle-type dryer was in the form of primary particles not agglomerated, so that normal particles can be obtained only by fine pulverization without coarse pulverization, thereby significantly reducing the amount of fine powder generated in the final super absorbent polymer.

On the other hand, in the case of Comparative Example 2 in which the carboxylic acid-based additive was not used when pulverizing the hydrogel polymer, the use of the paddle-type dryer as in Examples was not possible due to clumping/agglomeration between hydrogel polymers chopped in the drying process. In addition, in the case of Comparative Example 1 not using the carboxylic acid-based additive when pulverizing the hydrogel polymer, drying was possible with a belt-type dryer, which is a kind of fixed-bed type dryer, as in the conventional process. However, since the dried product was in a plate shape, a coarse pulverization process was required, and accordingly, a large amount of fine powder were generated in the final super absorbent polymer due to a two-stage dry pulverization process including coarse pulverization and fine pulverization.

In addition, in the case of Comparative Example 3 and 4 using a belt-type dryer or a fluidized bed dryer instead of a moving-type dryer in which particles can be dried by mechanical agitation such as a paddle-type dryer, there was a problem that drying was not effectively performed to the inside of the particles, or a lump was generated during drying even if the carboxylic acid-based additive was added during pulverization of the hydrogel polymer to prepare hydrous super absorbent polymer particles.

Therefore, in the case of performing both the step of mixing the hydrogel polymer with the carboxylic acid-based additive, followed by pulverization and the step of drying the pulverized product using a paddle-type dryer among moving-type dryers in the preparation of the super absorbent polymer, it was possible to significantly reduce the fine powder in the super absorbent polymer while increasing drying efficiency by high throughput per unit volume of the paddle-type dryer.

Test Example 2: Comparison of Drying Speed According to Hole Size of Fine Chopping Holes In order to check the drying speed according to a hole size of fine chopping holes of the meat chopper used in the preparation of a hydrogel polymer, a moisture content was measured in the following manner in the drying steps of Examples 1 to 3.

First, temperature sensors were installed at five positions in total (TR-1, TR-2, TR-3, TR-4, and TR-5) in the paddle dryer as shown in FIG. 3. Thereafter, a certain amount of samples were collected from an inlet of a pulverized product, TR-1 to TR-5, and an outlet in the dryer, which are seven positions in total, and the moisture content was calculated according to Equation 1 below for each sample. At this time, TR-1, TR-2, TR-3, TR-4, and TR-5 refer to the point at which 11.6%, 27%, 42.4%, 62.9% and 78.3% of drying has elapsed, respectively, when the point at which the pulverized product is added is set to 0% and the point at which the dried product is discharged is set to 100% during drying in the direction of the arrow.

$$\text{Moisture content(wt \%)} = \{[H_0(g) - H_1(g)]/H_0(g)\} \ast 100 \qquad \text{[Equation 1]}$$

In Equation 1,

The $H_0$ (g) is an initial weight of the collected sample, and the $H_1$ (g) is a weight of the sample measured after heating for 40 minutes including 5 minutes of a temperature raising step while increasing the temperature from room temperature to 180° C. and maintaining 180° C. using an infrared moisture meter.

The moisture contents with respect to the residence time of the samples collected at 7 points were calculated for each of Examples 1 to 3, and shown in a graph in FIG. 4. Referring to FIG. 4, it can be seen that the drying speed increased as the hole size of fine chopping holes of the meat chopper decreased during pulverization. Accordingly, it can be seen that as the hydrogel polymer is pulverized by passing through fine chopping holes having a smaller hole size, not only can a dried product having a smaller particle size be prepared, but also drying efficiency can be improved.

Test Example 3: Measurement of Physical Properties of Super Absorbent Polymer

The physical properties of the super absorbent polymers prepared in Examples and Comparative Examples were evaluated in the following manner, and the results are shown in Table 3 below. Unless otherwise indicated, all procedures were conducted in a constant temperature and humidity room (temperature 23±0.5° C., relative humidity 45±0.5%). In order to prevent measurement errors, an average value of three measurements was taken as measurement data. In addition, physiological saline or saline used in the evaluation of the following physical properties means a 0.9 wt % sodium chloride (NaCl) aqueous solution.

(1) Centrifuge Retention Capacity (CRC)

The centrifuge retention capacity by absorption ratio under a non-loading condition of each polymer was measured according to the EDANA WSP 241.3 method.

Specifically, after inserting $W_0$ (g, about 0.2 g) of the polymer uniformly in a nonwoven fabric envelope and sealing the same, it was soaked in saline (0.9 wt %) at room temperature. After 30 minutes, the envelope was centrifuged at 250 G for 3 minutes to drain, and the weight $W_2$ (g) of the envelope was measured. Further, after carrying out the same operation without using the resin, the weight $W_1$ (g) of the envelope was measured. Then, CRC (g/g) was calculated by using the obtained weight values according to the following Equation 2.

$$CRC(g/g) = \{[W_2(g) - W_1(g)]/W_0(g)\} - 1 \qquad \text{[Equation 2]}$$

(2) Extractable Contents (16 hr E/C)

The extractable contents of super absorbent polymers prepared in Examples and Comparative Examples were measured according to the EDANA (European Disposables and Nonwovens Association) WSP 270.2 method.

Specifically, 1.0 g of a super absorbent polymer was added to 200 g of a 0.9 wt % NaCl solution, kept to be soaked for 16 hours while stirring at 500 rpm, and the aqueous solution was filtrated by a filter paper. The filtrated solution was first titrated with a 0.1 N caustic soda solution to a pH of 10.0, and then reverse-titrated with a 0.1 N hydrogen chloride solution to a pH of 2.7. At this time, a polymer material that was not cross-linked was calculated from the amount required for the neutralization, and measured as the extractable contents.

(3) Vortex Time

The vortex time of the super absorbent polymers prepared in Examples and Comparative Examples was measured in the following manner.

① First, 50 mL of 0.9% saline was added to a 100 mL beaker with a flat bottom using a 100 mL Mass Cylinder.

② Next, after placing the beaker in the center of a magnetic stirrer, a magnetic bar (diameter 8 mm, length 30 mm) was put in the beaker.

③ Thereafter, the stirrer was operated such that the magnetic bar stirred at 600 rpm, and the lowermost part of vortex generated by the stirring was made to reach the top of the magnetic bar.

④ After confirming that the temperature of the saline in the beaker reached 24.0° C., 2±0.01 g of a super absorbent polymer sample was added and a stopwatch was operated at the same time. Then, the time taken until the vortex disappeared and a surface of liquid became completely horizontal was measured in seconds, and this was taken as the vortex time.

(4) Moisture Content

The moisture contents of the super absorbent polymers prepared in Examples and Comparative Examples were measured by determining the weight loss due to moisture evaporation in the sample during drying as follows.

First, a sample having a particle diameter of 150 to 850 μm was taken out from the prepared super absorbent polymer, and its weight was measured as $H_0$ (g), an initial weight of the sample. Thereafter, a weight of the sample was measured after heating for 40 minutes including 5 minutes of a temperature raising step while increasing the temperature from room temperature to 180° C. and maintaining 180° C. using an infrared moisture meter as the $H_1$ (g). Then, the moisture content was calculated according to Equation 1 above.

TABLE 3

| | Example 1 | Example 2 | Example 3 | Example 4 | Comparative Example 1 |
|---|---|---|---|---|---|
| Hole size of fine chopping holes of meat chopper (mm) | 3 | 2 | 1 | 2 | 16 |
| Additive input[1] | 0.3 | 0.3 | 0.3 | 0.2 | — |
| Type of dryer | Paddle-type dryer | Paddle-type dryer | Paddle-type dryer | Paddle-type dryer | Belt-type dryer |
| CRC (g/g) | 55 | 57.1 | 57.5 | 54.7 | 54.5 |
| 16 hr E/C (wt %) | 10.4 | 11.4 | 14.4 | 10.2 | 13 |
| Vortex time (sec) | 66 | 56 | 51 | 57 | 71 |
| Moisture content (wt %) | 1.7 | 1.8 | 1.4 | 1.4 | 1.1 |

[1] in parts by weight based on 100 parts by weight of the hydrogel polymer

As shown in Table 3, in the case of the super absorbent polymers prepared in Examples, the extractable contents were mostly reduced and the vortex time was significantly improved while having similar moisture content and higher water retention capacity, compared to the super absorbent polymer of Comparative Example 1 which was dried with a belt-type dryer after pulverizing the hydrogel polymer without adding any additives.

Thus, it can be seen that when the carboxylic acid-based additive is added to pulverize the hydrogel polymer and the pulverized product is dried in a paddle-type dryer for preparing a super absorbent polymer, it is possible to manufacture a super absorbent polymer having a significantly reduced fine powder content without deterioration in water retention capacity and at the same time exhibiting improved water retention capacity and low vortex time.

What is claimed is:

1. A method of preparing a super absorbent polymer, comprising
   forming a hydrogel polymer by cross-linking polymerization of a water-soluble ethylene-based unsaturated monomer having at least partially neutralized acidic groups in the presence of an internal cross-linking agent and a polymerization initiator;
   mixing the hydrogel polymer with a carboxylic acid-based additive, followed by pulverization to prepare a pulverized product containing hydrous super absorbent polymer particles, wherein an amount of the carboxylic acid-based additive mixed with the hydrogel polymer is 0.2 to 1 parts by weight based on 100 parts by weight of the hydrogel polymer;
   drying the pulverized product with a paddle-type dryer to prepare super absorbent polymer particles; and
   fine-pulverizing particles having a particle diameter of more than 850 μm among the super absorbent polymer particles,
   wherein the carboxylic acid-based additive comprises at least one selected from the group consisting of a carboxylic acid represented by the following Chemical Formula 1 and a salt thereof:

[Chemical Formula 1]

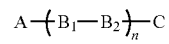

in Chemical Formula 1,
A is alkyl having 5 to 21 carbon atoms,
$B_1$ is —OCO—, —COO—, or —COOCH($R_1$)COO—,
$B_2$ is —$CH_2$—, —$CH_2CH_2$—, —CH($R_2$)—, —CH=CH—, or —C≡C—,
wherein, $R_1$ and $R_2$ are each independently alkyl having 1 to 4 carbon atoms,
n is an integer of 1 to 3, and
C is a carboxyl group.

2. The method of claim 1,
   wherein the hydrogel polymer has a moisture content of 30 to 70 wt %.

3. The method of claim 1,
   wherein in Chemical Formula 1,
   A is —$C_6H_{13}$, —$C_{11}H_{23}$, —$C_{12}H_{25}$, —$C_{17}H_{35}$, or —$C_{18}H_{37}$.

4. The method of claim 1,
   wherein in Chemical Formula 1,
   $B_1$ is

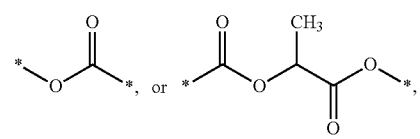

wherein * is a bonding site with a neighboring atom.

5. The method of claim 1,
wherein in Chemical Formula 1,
$B_2$ is

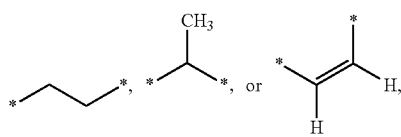

wherein * is a bonding site with a neighboring atom.

6. The method of claim 1,
wherein the salt comprises at least one selected from the group consisting of an alkali metal salt and an alkaline earth metal salt.

7. The method of claim 1,
wherein the carboxylic acid-based additive comprises any one of compounds represented by the following Chemical Formulae 1-1 to 1-7:

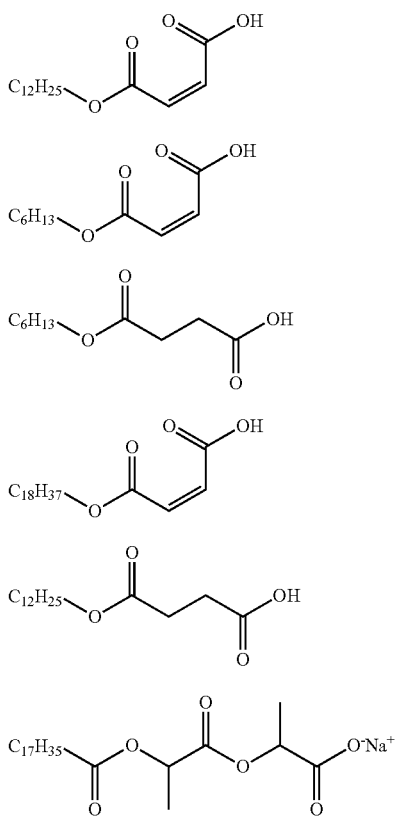

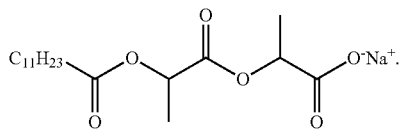

8. The method of claim 1,
wherein the carboxylic acid-based additive is mixed in a solution form.

9. The method of claim 1,
wherein the pulverization is performed in a wet manner.

10. The method of claim 1,
wherein the pulverization is performed by pushing the hydrogel polymer mixed with the carboxylic acid-based additive into a perforated plate provided with a plurality of fine chopping holes having a certain size.

11. The method of claim 10,
wherein a hole size of the fine chopping holes is 0.2 mm to 6 mm.

12. The method of claim 1,
wherein the paddle-type dryer has two rotating shafts.

13. The method of claim 12,
wherein the rotating shafts rotate at 1 to 120 rpm during the drying the pulverized product.

14. The method of claim 1,
wherein the drying is performed at a temperature of 80° C. to 250° C. for 10 minutes to 3 hours.

15. The method of claim 1,
wherein a dried product after the drying the pulverized product contains 90 wt % or more of super absorbent polymer particles having a particle diameter of 2000 μm or less based on a total weight of the dried product.

16. The method of claim 1,
further comprising classifying the super absorbent polymer particles after the drying and before the fine-pulverizing.

17. The method of claim 1,
wherein the super absorbent polymer particles contain 90 wt % or more of super absorbent polymer particles having a particle diameter of 150 μm to 850 μm based on a total weight of the super absorbent polymer particles.

18. The method of claim 1,
wherein the super absorbent polymer particles contain less than 10 wt % of fine powder having a particle diameter of less than 150 μm based on a total weight of the super absorbent polymer particles.

19. The method of claim 1,
further comprising preparing a super absorbent polymer having a surface cross-linked layer formed on at least a part of a surface by cross-linking the surface of the super absorbent polymer in the presence of a surface cross-linking agent.

* * * * *